United States Patent

[11] 3,586,291

| [72] | Inventor | Jerry P. Malec<br>2832 N. 70th Avenue, Omaha, Nebr. 68104 |
|---|---|---|
| [21] | Appl. No. | 801,282 |
| [22] | Filed | Feb. 24, 1969 |
| [45] | Patented | June 22, 1971 |
| | | Continuation-in-part of application Ser. No. 752,829, now abandoned |

[54] MEANS FOR CONTROLLING FLUID FLOW
5 Claims, 5 Drawing Figs.

[52] U.S. Cl.................................................. 251/324,
137/505, 137/505.18, 137/525
[51] Int. Cl........................................................F16k 31/163
[50] Field of Search............................................137/505.41,
505.18, 505.25, 505.38, 525; 251/DIG. 1, 324

[56] References Cited
UNITED STATES PATENTS

| 2,730,269 | 1/1956 | Earle | 137/505.18 X |
| 2,737,201 | 3/1956 | St. Clair | 137/505.41 |
| 3,202,182 | 8/1965 | Haviland | 151/DIG. 1 UX |
| 3,324,873 | 6/1967 | Trombatore | 137/505.18 X |
| 3,348,576 | 10/1967 | Ackerman | 137/505.18 X |

*Primary Examiner*—Harold W. Weakley
*Attorney*—Zarley, McKee & Thomte

ABSTRACT: A means for controlling fluid flow including a housing having an inlet port adapted to be connected to a source of fluid under pressure and also having a discharge port adapted to be connected to an apparatus requiring controlled fluid flow or pressure. The housing has a passageway means provided therein between the inlet and outlet ports and is in communication therewith. A valve means is movably mounted in the housing and is adapted to selectively close the passageway at times. The valve means includes an O-ring movably mounted thereon which is adapted to selectively close the passageway means when the valve means is moved in one direction with respect to the housing and to selectively open the passageway means when the valve means is moved in an opposite direction with respect to the housing. A resilient means is also provided in the housing to normally bias the valve means in the said opposite direction.

INVENTOR
JERRY P. MALEC
BY
Zarley, McKee & Thomte
ATTORNEYS

MEANS FOR CONTROLLING FLUID FLOW

This a continuation-in-part application of my copending application, Ser. No. 752,829 filed Aug. 15, 1968.

Conventional pressure regulators usually employ approximately 20 parts and are generally of the piston or diaphragm type. The diaphragm-type pressure regulators are somewhat less expensive than the piston-type regulators but cause a restriction of the air flowing therethrough. The piston-type pressure regulators are an improvement over the diaphragm-type regulators but are more expensive to manufacture. The parts in a diaphragm regulator which are subjected to extreme wear are the diaphragms and the poppet seals. The parts in the piston-type pressure regulators which are exposed to extreme wear are the seals, pistons, cylinder walls and poppet seals.

Pressure regulator is accomplished in most spring-balanced-type regulators by balancing the downstream or regulated air against the large spring that is adjusted to various compression values as are required. The diaphragm or piston is the medium usually acted upon by the regulated air and the spring. When the regulated air and the spring are in equilibrium, the air controlled by the poppet or fill valve is shut off to the downstream side of the regulator. Usually a spring of the right "K" weight for a value of pressure to be regulated is necessary to provide maximum movement of the throttle valve for differences in increments of regulated pressure. The throttle valve areas in both of the piston and diaphragm-type regulators is quite small in relation to the size of the regulator itself. Additionally, the flow rates of the conventional regulators are not completely satisfactory in relationship to their size and the droop of the regulators is also less than satisfactory.

The pressure regulator disclosed in applicant's copending application has been found to be very efficient in operation but the action of air on the O-ring therein sometimes result in a variance in the regulated pressure and such variance is overcome by the device disclosed herein.

Therefore, it is a principal object of this invention to provide a means for controlling fluid flow.

A further object of this invention is to provide a flow sensor mechanism.

A further object of this invention is to provide a means for controlling fluid flow, namely a pressure regulator, which has only approximately one-half the number of parts of the conventional regulators.

A further object of this invention is to provide a pressure regulator which is many times more sensitive than conventional regulators of comparable size and flow.

A further object of this invention is to provide a pressure regulator which has a throttle valve area of approximately 50 to 100 times the size of the throttle valve areas of regulators of the same physical size but of conventional design.

A further object of this invention is to provide a means for controlling fluid flow which is small in size but has a very high flow rate.

A further object of this invention is to provide a pressure regulator which achieves the same results as conventional regulators but which is much smaller in physical size.

A further object of this invention is to provide a flow sensor mechanism utilizing an O-ring which rolls into and out of engagement with a discharge port means.

A further object of this invention is to provide a pressure regulator wherein the internal passages are also larger than the airline inside diameter.

A further object of this invention is to provide a pressure regulator which is easily repaired without special tools.

A further object of this invention is to provide a pressure regulator which has improved droop qualities.

A further object of this invention is to provide a pressure regulator wherein the parts therein will be long wearing due to the relatively small movement of the flow sensor valve.

A further object of this invention is to provide a pressure regulator which eliminates the need of special balanced poppets for continuously bleeding the air or diaphragm chambers.

A further object of this invention is to provide a pressure regulator which eliminates the "hunting," vibration and singing phenomena associated with conventional regulators.

A further object of this invention is to provide a pressure regulator which is insensitive to dirt, moisture, oil or vibration.

A further object of this invention is to provide a pressure regulator which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
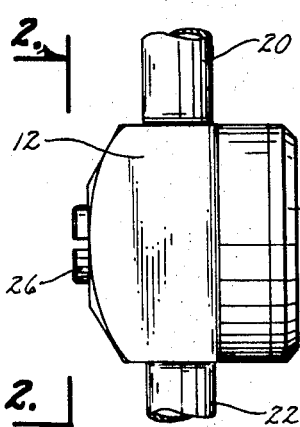
FIG. 1 is a side elevational view of the device.
Figure 2:
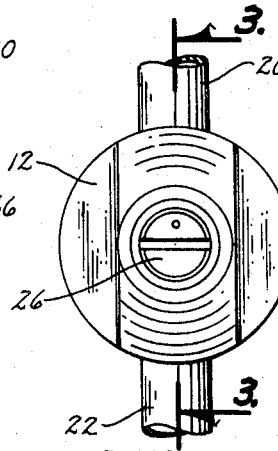
FIG. 2 is a top view of the device.

The device of this invention is generally designated by the reference numeral 10 and includes a housing 12 having an inlet port means 14 provided at one end thereof and a discharge port means provided at the other end thereof. The numeral 18 generally designates a passageway formed in housing 12 between the ports 14 and 16. A suitable conduit 20 is shown to be threadably secured in the inlet port 14 while a suitable conduit 22 is shown to be threadably secured in the discharge port 16. Conduit 20 would be connected to a source of fluid such as air under pressure while the conduit 22 would be connected to an apparatus requiring controlled or regulated fluid pressure.

Figure 4:
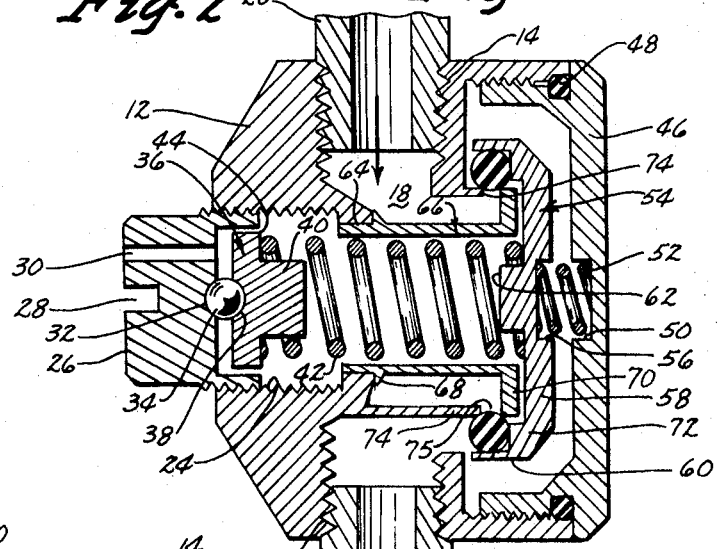
FIG. 4 is a sectional view similar to that of FIG. 3 except that the valve means is illustrated in a closed position.
Figure 5:
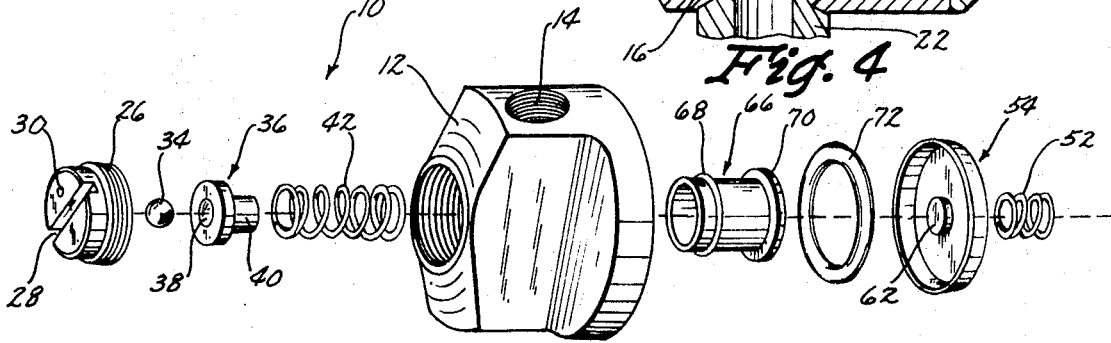
FIG. 5 is an exploded perspective view of the device of this invention.

Housing 12 is provided with an internally threaded opening 24 which threadably receives an adjustment screw 26 having a slot 28 formed in its outer end. Screw 26 is also provided with an aspirator port 30 formed therein and extending therethrough as seen in FIG. 4. The inner end of the screw 26 is provided with a recess portion 32 which partially receives a ball 34 therein. The numeral 36 generally designates a guide provided at the inner end of the screw 26 and having a recessed portion 38 formed therein which partially receives the ball 34. Guide 36 is provided with an inwardly extending shank portion 40 as best seen in FIG. 4. A spring means 42 embraces the shank portion 40 and engages the shoulder 44 of guide 36 and extends inwardly therefrom.

A cap 46 is threadably mounted on the bottom of the housing 12 and has an O-ring 48 provided thereon to effectively seal the interior of the housing 12 from the atmosphere. The inside surface of cap 46 is provided with a recess portion 50 which receives one end of a spring means 52 extending inwardly therefrom. The numeral 54 generally refers to a valve means having a recessed portion 56 formed in its outer end which receives the other end of the spring means 52. Valve means 54 includes a base portion 58 and a peripheral skirt portion 60 extending inwardly therefrom as best illustrated in FIG. 4. Valve means 54 is provided with a shank portion 62 which extends inwardly from its inside surface and which is embraced by the other end of the spring means 42.

Housing 12 has an annular shoulder 64 formed therein into which is press fitted one end of a sleeve 66. Sleeve 66 has a peripheral ridge 68 extending outwardly therefrom which engages the shoulder 64 to limit the movement of the sleeve 66 in the housing. Sleeve 66 is hollow and the spring means 42 extends through the interior thereof. Sleeve 66 has a flange 70 extending radially outwardly from the end thereof (FIG. 4) and is adapted to accommodate an O-ring 72 thereon which is positioned between the outer edge of the flange 70 and the inside surface of the skirt portion 60. The numeral 74 designates a shoulder portion (FIG. 4) in housing 12 defining a passageway 75 between it and flange 70. O-ring 72 is adapted to close passageway 75 at times as illustrated in FIG. 4.

Figure 3:
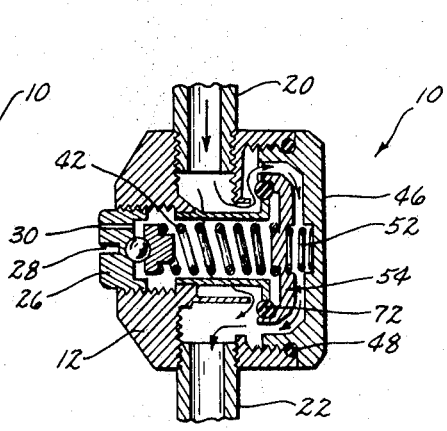
FIG. 3 is a sectional view of the device as seen along lines 3–3 of FIG. 2.

The tension of the spring means 42 can be adjusted by threadably rotating the screw 26 with respect to the housing 12. The inward movement of the guide 36 by the screw 26 results in the tension in the spring means 42 being increased and exerting a force against the valve means 54 towards the right as viewed in FIG. 4. FIG. 4 illustrates the O-ring 72 effectively sealing the passageway 18 and passageway 75 so that the conduits 20 and 22 are not in communication with each other. The spring means 52 normally urges the valve 54 to the left as viewed in FIG. 4 which yieldably maintains the O-ring 72 in its sealing engagement of the passageway 18. Adjustment of the screw 26 with respect to housing 12 maintains the valve 54 in the desired position so that the predetermined volume of fluid may pass from the conduit 20, into passageway 16 and into conduit 22. FIG. 3 illustrates the relationship of the component parts of the device when the valve means 54 has been moved to the right due to the force of the spring means 42. As valve means 54 is moved to the right as viewed in FIG. 3, the O-ring 72 is rolled out of sealing engagement with respect to the shoulder 74 and the flange 70 so that air may pass through the device in the manner illustrated by the arrows in FIG. 3. It can be appreciated that the air will also act on the right-hand side or outer surface of the valve means 54 as it passes through the device which results in a more efficient operation of the valve means 54. The design of the housing 12 and sleeve 66 is such that the valve means 54 is substantially shielded from the incoming air to reduce any fluttering of the valve means which might possibly otherwise occur.

From the foregoing description it can be seen that a means for controlling fluid flow and more particularly a pressure regulator has been provided which has only approximately one-half the number of parts of the conventional regulators. The device disclosed herein provides a pressure regulator which is much more sensitive than the conventional regulators of comparable size and flow and provides a regulator which has a throttle valve area of approximately 50 to 100 times the size of the throttle valve areas of regulators of the same physical size but of conventional design. The device disclosed herein may be small in size but would still have a very high flow rate. The device disclosed herein achieves superior results as compared to the conventional regulators and may be constructed to a smaller scale than the conventional regulators. It can also be seen that the flow sensor mechanism (valve means 54 and its associated structure) disclosed herein utilizes on O-ring which rolls into and out of engagement with a valve seat means to close the passageway between the inlet and discharge ports. The mechanism described herein can obviously be used in other environments than pressure regulators and may be easily repaired without special tools.

The device disclosed herein provides a regulator wherein the internal passages are all larger than the airline inside diameter. The device disclosed herein has also been found to exhibit improved droop qualities and eliminates the hunting, vibration and singing phenomena associated with conventional pressure regulators. The regulator disclosed herein is insensitive to dirt, moisture, oil and vibration and are extremely long wearing.

In summary, it can be seen that an apparatus has been described wherein an O-ring 72 rolls across a "ring"-type orifice 75 with both diameters in contact with the O-ring being the same. When pressure to be regulated is applied to the apparatus, it tends to have no effect to open the downstream port as the pressure to be regulated is raised. Only when spring bias pressure is applied does the O-ring roll away from the orifice 75 and regulation begins.

When the O-ring 72 seats directly and evenly over the "ring"-type orifice 75, increases in pressure act directly out against the O-ring tending not to roll it away from the pressure source. Pressure fluctuating on the "high"-pressure side have very little adverse effect on the regulated pressure in this construction.

The apparatus described herein, namely the flow sensor valve, produces a greater opening of the control port than is possible with conventionally designed regulators. The instant apparatus can be substituted for any valve which is controlled by fluid action that has a short stroke activated piston diaphragm or bellows as a source of movement of the valve mechanism. The concept of this apparatus can be used to provide pilot-operated valves, high-pressure (3,000 p.s.i. or over) valves that do not destroy the valve seats and seals when operating, and other valves used to expel water from air filter trap mechanisms. The principal of the "rolling" O-ring can also be used to construct pumps and pressurizing devices.

Thus it can be seen that a vastly superior means for controlling fluid flow has been provided which achieves all of its stated objectives.

Some changes may be made in the construction and arrangement of my Means For Controlling Fluid Flow without departing from the real spirit and purpose of my invention, and it is my intention to cover by my claims any modified forms of structure or use of mechanical equivalents which may be reasonably included within their scope.

I claim:

1. A means for controlling fluid flow, comprising,
a housing having inlet and outlet ports formed therein, said inlet port adapted to be connected to a source of fluid pressure, said outlet port adapted to be connected to an apparatus requiring controlled fluid pressure, said housing having a passageway means provided therein between said inlet and outlet ports and being in communication therewith,
a valve means movably mounted in said housing adapted to selectively close said passageway means at times, said valve means including an O-ring movably mounted thereon and adapted to selectively close said passage way means when said valve means is moved in one direction with respect to said housing and to selectively open said passageway means when said valve means is moved in an opposite direction with respect to said housing,
said valve means including a base portion having a peripheral skirt portion extending transversely therefrom which movably embraces said O-ring with said skirt portion causing said O-ring to roll upon itself on said valve means as said valve means is moved,
and means normally biasing said valve means in said opposite direction.

2. The means of claim 1 wherein said O-ring movably embraces a sleeve means positioned in said passageway means.

3. The means of claim 2 wherein said housing includes opposite ends, said passageway means being between said opposite ends, one of said ends being selectively threadably closed by a cap means having inner and outer sides, an adjustment screw threadably movably mounted in the outer end of said housing and being movable towards and away from said cap means, said adjustment screw having inner and outer ends, said housing means including a first spring means operatively engaging the inner end of said screw and extending therefrom, said valve means being positioned between said screw and said cap means, said first spring means engaging said valve means and normally biasing said valve means towards said cap means, said sleeve means partially embracing said first spring means and having a peripheral flange portion, said flange portion and said housing defining said passageway means, said O-ring movably embracing said flange portion.

4. The means of claim 3 wherein a second spring means is positioned between said valve means and said cap means normally biasing said valve means in said one direction.

5. The means of claim 3 wherein said screw has a bore formed therein extending therethrough, the interior of said sleeve being in communication with said screw bore to permit the interior of said sleeve to communicate with the atmosphere outside of said housing.